United States Patent
Chevalier et al.

(10) Patent No.: US 6,853,961 B2
(45) Date of Patent: Feb. 8, 2005

(54) METHOD FOR ESTIMATING A CORRELATION MATRIX OF INTERFERING SIGNALS RECEIVED THROUGH A SENSOR ARRAY

(75) Inventors: Pascal Chevalier, Courbevoie (FR); François Pipon, Paris (FR)

(73) Assignee: Thales, Paris (FR)

( * ) Notice: Subject to any disclaimer, the term of this patent is extended or adjusted under 35 U.S.C. 154(b) by 233 days.

(21) Appl. No.: 10/221,178

(22) PCT Filed: Mar. 16, 2001

(86) PCT No.: PCT/FR01/00801
§ 371 (c)(1),
(2), (4) Date: Sep. 20, 2002

(87) PCT Pub. No.: WO01/71548
PCT Pub. Date: Sep. 27, 2001

(65) Prior Publication Data
US 2003/0020650 A1 Jan. 30, 2003

(30) Foreign Application Priority Data
Mar. 20, 2000 (FR) .......................................... 00/03597

(51) Int. Cl.[7] .............................................. G06F 15/00
(52) U.S. Cl. ...................... 702/196; 702/183; 702/189; 702/190; 702/194; 702/197
(58) Field of Search ................................ 370/252, 253, 370/234, 233, 392, 235, 241; 714/2, 4, 18, 20, 21, 37, 736, 799; 367/100, 128, 129; 702/27, 85, 183, 185, 189, 190, 191, 192, 193, 194, 196, 197, 122, 182; 342/17, 90, 154, 149, 157, 189–196; 709/200–203, 217, 224, 229, 231, 233, 235

(56) References Cited

U.S. PATENT DOCUMENTS

| 5,262,785 | A | 11/1993 | Silverstein et al. |
| 5,262,789 | A | 11/1993 | Silverstein |

(List continued on next page.)

OTHER PUBLICATIONS

A. Belouchrani et al.: "Array processing in correlated noise fields based on joint eigen–decomposition of spatial–temporal correlation matrices" Conference Record of Thirtieth Asilomar Conference on Signals, Systems and Computers (Cat. No. 96CB36004), vol. 1, pp. 385–388 Nov. 3, 1996–Nov. 6, 1996.

P. Stoica et al.: "Detection tests for array processing in unknown correlated noise fields" IEEE Transactions on Signal Processing, vol. 45, No. 9, pp. 2351–2362 09/97.

*Primary Examiner*—Marc S. Huff
*Assistant Examiner*—Carol S Tsai
(74) *Attorney, Agent, or Firm*—Oblon, Spivak, McClelland, Maier & Neustadt, P.C.

(57) ABSTRACT

Process for estimating the correlation matrix of signals of unknown characteristics in an array of N sensor. The process determines the correlation matrix $\hat{R}s$ of the signals of known characteristics, estimates the correlation matrix $\hat{R}x$ of the sensor signals, forms a matrix A equal to $A = \hat{R}s^{-1/2} \hat{R}x \hat{R}s^{-1/2}$ and decomposes the matrix A into eigenelements, constructs a matrix B based on the eigenelements of the matrix A, and determines the estimated correlation matrix $\hat{R}b$ of the interfering signals based on the estimated matrix $\hat{R}s$ and of the matrix B, such that $\hat{R}b = \hat{R}s^{1/2} B \hat{R}s^{1/2}$. Such a process may find application to antenna processing.

10 Claims, 3 Drawing Sheets

U.S. PATENT DOCUMENTS

Figure 1:
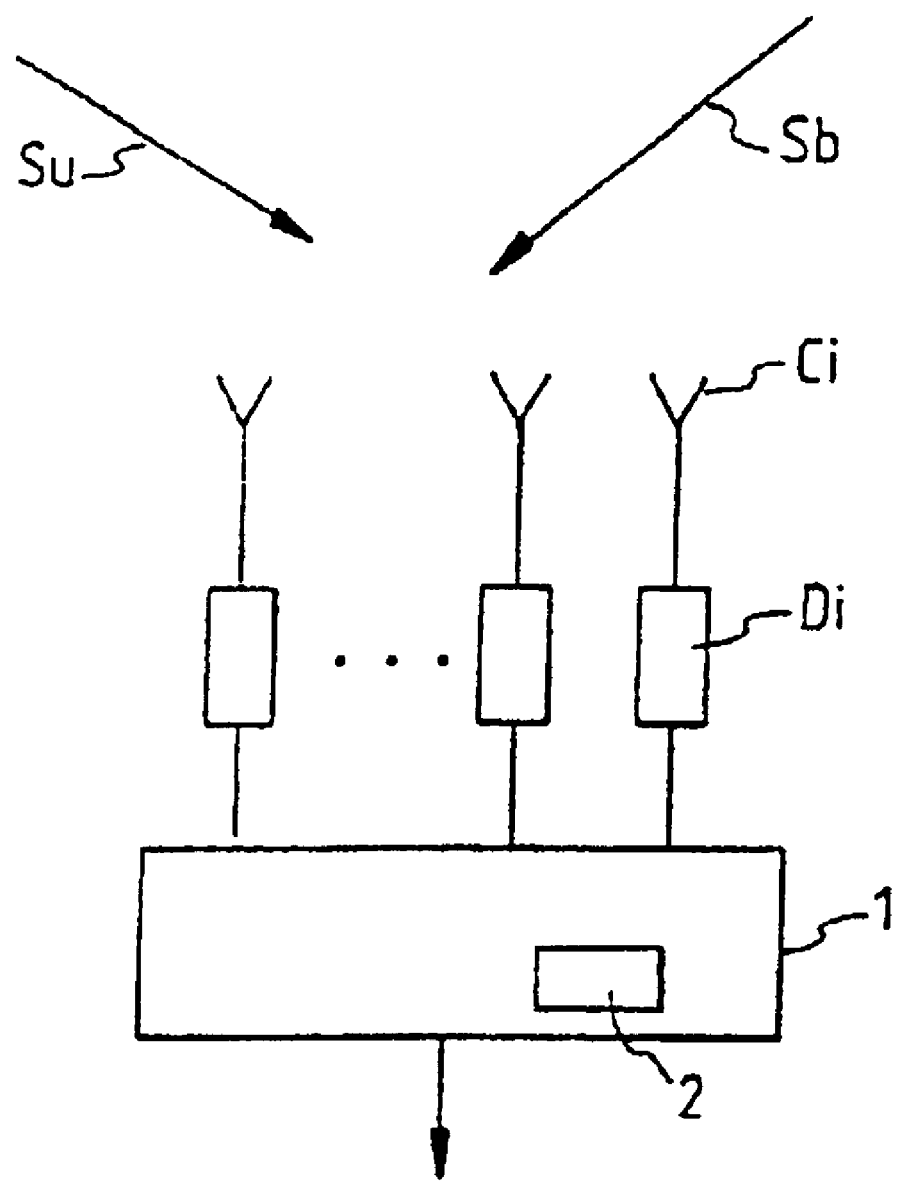

| | | | |
|---|---|---|---|
| 5,299,148 A | * | 3/1994 | Gardner et al. ............. 702/196 |
| 5,359,333 A | | 10/1994 | Withers, Jr. |
| 5,583,792 A | * | 12/1996 | Li et al. ..................... 709/224 |
| 5,752,168 A | | 5/1998 | Monot et al. |
| 5,812,090 A | | 9/1998 | Chevalier et al. |
| 5,870,430 A | | 2/1999 | Pipon et al. |
| 5,917,919 A | * | 6/1999 | Rosenthal ................ 381/71.11 |
| 6,008,759 A | | 12/1999 | Tangemann et al. |
| 6,087,974 A | * | 7/2000 | Yu .............................. 342/62 |
| 6,118,832 A | | 9/2000 | Mayrargue et al. |
| 6,239,746 B1 | | 5/2001 | Pipon et al. |
| 6,240,098 B1 | | 5/2001 | Thibault et al. |
| 6,243,415 B1 | | 6/2001 | Pipon et al. |
| 6,349,207 B1 | | 2/2002 | Monot et al. |
| 6,446,025 B1 | * | 9/2002 | Nakamura et al. .......... 702/159 |
| 6,653,973 B2 | * | 11/2003 | Yu ............................... 342/90 |
| 2003/0043929 A1 | * | 3/2003 | Sampath .................... 375/267 |
| 2003/0061035 A1 | * | 3/2003 | Kadambe .................... 704/203 |

* cited by examiner

METHOD FOR ESTIMATING A CORRELATION MATRIX OF INTERFERING SIGNALS RECEIVED THROUGH A SENSOR ARRAY

The present invention relates to a process for estimating a correlation matrix of signals with unknown characteristics, which signals are received by an array comprising a specified number N of sensors, the sensors receiving signals composed in particular of signals having known characteristics and of signals of unknown characteristics such as noise and/or jammers.

The invention finds its application in various fields, in particular the following:
- the goniometry of various sources arriving at the array, that is to say the determination of their directions of arrival,
- spatial filtering so as to protect one or more links from interfering sources,
- any other device in which it is desirable to estimate the correlation matrix of useful signals and that of the interfering signals.

In numerous applications in particular in the field of telecommunications, the use of antenna processing methods is turning out to be especially beneficial.

Among the signals arriving at the array of sensors which constitute the antenna, some are of known characteristics, the useful signals in telecommunications for example, others exhibit unknown characteristics, such as interference. A large number of these methods are based on the estimation of the correlation matrix of the signals received by the sensors.

In the subsequent description various parameters and notations are used, in particular the following:

N, the number of sensors of an array, x(n), the observation vector received by the array of N sensors after digitization, or sensor signals, $x_u(n)$, the component of the observation vector corresponding to the signals referred to as useful signals, whose characteristics are known to the processing, M, the number of useful signals, $X_b(n)$, the component of the observation vector corresponding to the signals referred to as interfering signals (noise and/or jammers), whose characteristics are unknown to the processing, P, the number of interfering signals, $Rx=E(x(n) x(n)^\dagger)$, the theoretical correlation matrix of the sensor signals, Rs, the theoretical correlation matrix of the signal vector $x_u(n)$, Rb, the theoretical correlation matrix of the signal vector $x_b(n)$, '†', represents the transposition-conjugation operation.

Assuming that the useful signals are decorrelated from the interfering signals, relation (1) linking the various theoretical correlation matrices defined hereinabove can be expressed in the following manner:

$$Rx=E(x(n)x(n)^\dagger)=E([x_u(n)+x_b(n)][x_u(n)+x_b(n)]^\dagger)$$

$$Rx=E(x_u(n)x_u(n)^\dagger)+E(x_b(n)x_b(n)^\dagger)+2Re\{E(x_u(n)x_b(n)^\dagger)\}$$

$$Rx=Rs+Rb \quad (1)$$

Knowing the correlation matrix of the useful signals Rs and of the matrix Rx, the matrix Rb can be obtained simply on the basis of relation (1):

$$Rb=Rx-Rs. \quad (1')$$

Applied to the estimates of these correlation matrices, relation (1') does not yield good results, as is demonstrated for example in the book "Introduction to adaptive arrays" written by R. A. Monzingo, W. Miller, and published by John Wiley and Sons, New York, 1980. Specifically, the estimate of the correlation matrix Rx also comprises terms relating to the correlation between the useful signals and the interfering signals $E(x_u(n)\ x_b(n)^\dagger)$, which are only asymptotically zero.

The subject of the invention relates to a process making it possible to estimate in particular the correlation matrix of the interfering signal on the basis of the correlation matrix of the signals received on an array comprising a number N of sensors and of an estimate of the correlation matrix of the useful signals.

The invention relates to a process for estimating the correlation matrix of signals of unknown characteristics in an array comprising a number N of sensors, said sensors receiving at least the signals Sb of unknown characteristics and signals Su of known characteristics, the Su and Sb together forming the sensor signals Sx. It is characterized in that it comprises at least the following steps:

a) determining the correlation matrix $\hat{R}s$ or Rs, α of the signals Su of known characteristics, b) estimating the correlation matrix $\hat{R}x$ of the sensor signals Sx, c) forming a matrix A equal to $A=\hat{R}s^{-1/2}\hat{R}x\ \hat{R}s^{-1/2}$ d) decomposing the matrix A into eigenelements so as to obtain its eigenvalues $\lambda_i$ and its eigenvectors $u_1$, with $$\lambda_1 \leq \lambda_2 \leq \ldots \leq \lambda_N$$

e) constructing a matrix B having eigenvectors $v_1$ substantially equal to the eigenvectors $u_i$ of the matrix A, and eigenvalues $\gamma_i$ equal to the eigenvalues $\lambda_1$ to within a constant β, the value of the constant β being determined on the basis of the N-P smallest eigenvalues of the matrix A, P being the number of jammers or interfering signals, with $$\lambda_1 \leq \beta \leq \lambda_N$$

f) determining the estimated correlation matrix $\hat{R}b$ of the interfering signals Sb on the basis of the estimated matrix $\hat{R}s$ and of the matrix B, such that $\hat{R}b=\hat{R}s^{1/2}\ B\ \hat{R}s^{1/2}$.

For a matrix B of rank N-P, the value of the constant β is for example the smallest of the eigenvalues λi or else it is determined on the basis of the N-P smallest of the eigengvalues λi by taking the average value.

The process according to the invention applies also to antenna processing.

The invention also relates to a device for estimating the correlation matrix of signals of unknown characteristics in an array comprising a number N of sensors, said sensors receiving at least the signals Sb of unknown characteristics and signals Su of known characteristics, the Su and Sb together forming the sensor signals Sx. It is characterized in that it comprises means suitable for implementing the process according to one of the characteristics described herein above.

The invention exhibits in particular the following advantages:
- in applications involving goniometry, it makes it possible to reduce the number of sensors used, the goniometry being performed solely on certain signals, and to improve the accuracy of goniometry of the selected sources,
- in SLC applications, the abbreviation standing for the expression "side lobe canceller", the sought-after power minimization can be carried out solely on the interfering signals while protecting the useful signals,
- in SMF applications, the abbreviation standing for (spatial matched filter), the process according to the invention makes it possible to increase the speed of convergence of the processing and the robustness with respect to errors.

Figure 2:
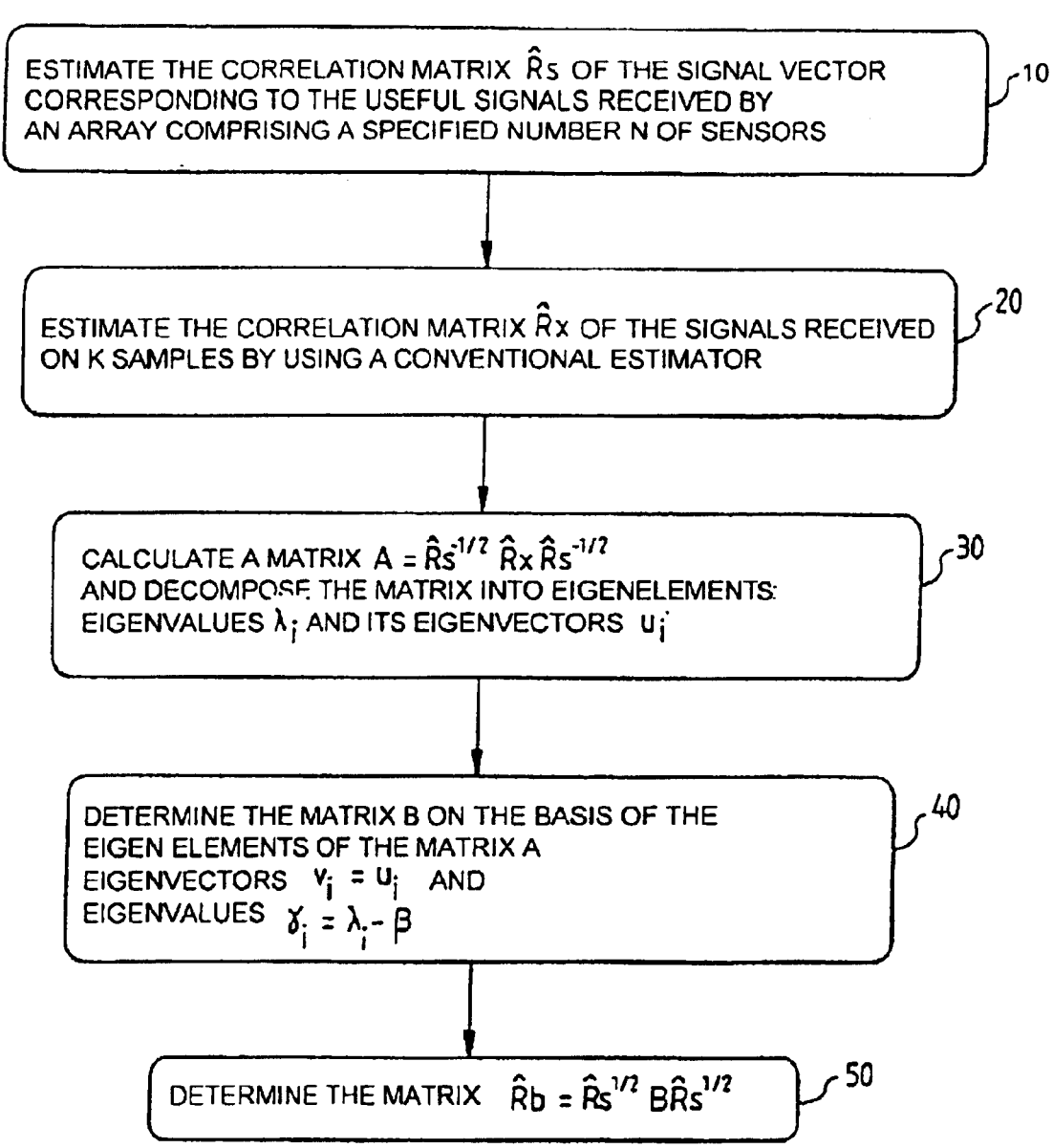
Figure 3:
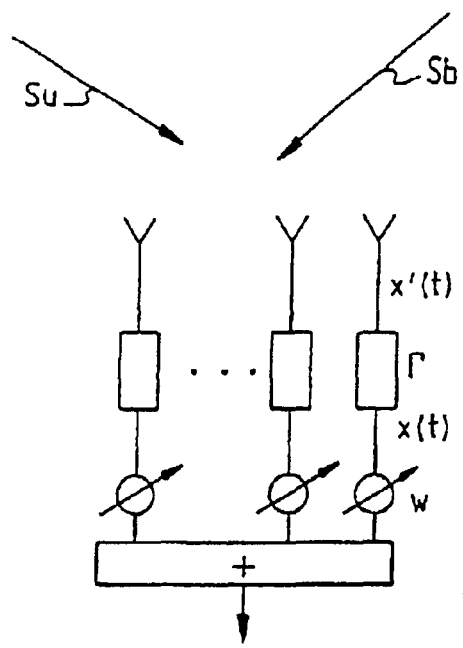
Figure 4:
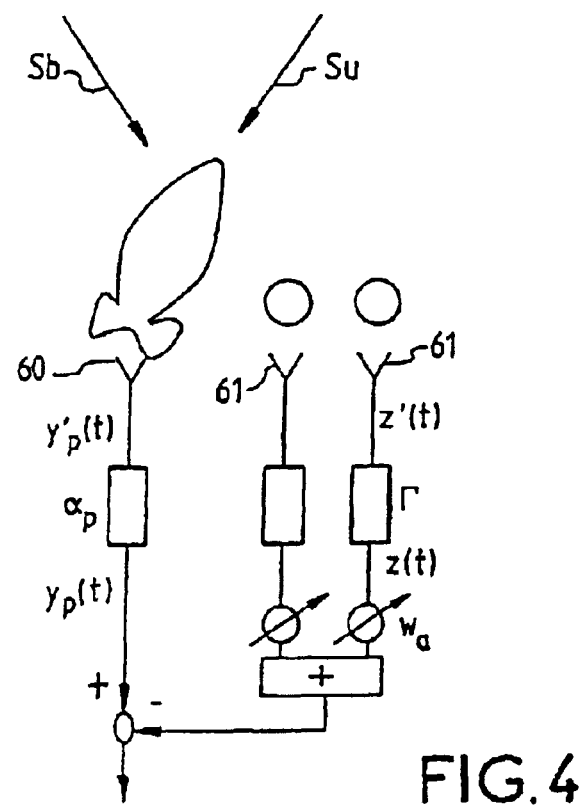

Other characteristics and advantages of the invention will become apparent with the aid of the description which follows given, by way of wholly nonlimiting illustration, in conjunction with the appended drawings which represent:

FIG. 1 diagrammatically shows the various signals arriving at an array comprising a number N of sensors, FIG. 2 represents an algorithm comprising the steps of the process according to the invention, FIG. 3 diagrammatically shows an SLC device, and FIG. 4 represents an application of the process according to the invention to spatial matched filtering.

The process according to the invention uses in particular the estimates of the correlation matrix of the useful signals and of the correlation matrix of the sensor signals so as to deduce therefrom the estimate of the correlation matrix of the interfering signals.

FIG. 1 diagrammatically shows an antenna comprising an array of N sensors Ci. The sensors Ci receiving all the useful signals, noise, jammers, are each linked with a receiver, the N receivers Di together constituting a multichannel receiver known to the person skilled in the art. The multichannel receiver is itself linked to a device 1 for digitizing and processing the signals by carrying out the steps of the process according to the invention. To do this, the device comprises for example a microprocessor 2 or a computer suitable for implementing the steps.

The process according to the invention relies on concepts recalled by using the theoretical matrices hereinbelow, on the basis of the relation $$Rx = Rs + Rb \qquad (1)$$

Rs stands for the matrix Rs which may be known or more generally $Rs,\alpha$ the matrix Rs known to within the coefficient $\alpha$; $Rs,\alpha = \alpha Rs$.

The idea consists in a) "whitening" the observation matrix Rs as follows:

1—if the matrix Rs is invertible, the process consists in right and left multiplying the two terms of equation (1) by $(Rs,\alpha)^{-1/2}$, the following expression (2) is obtained:

$$(Rs,\alpha)^{-1/2} Rx (Rs,\alpha)^{-1/2} = (Rs,\alpha)^{-1/2} Rs (Rs,\alpha)^{-1/2} + (Rs,\alpha)^{-1/2} Rb (Rs,\alpha)^{-1/2}$$

$$(Rs,\alpha)^{-1/2} Rx (Rs,\alpha)^{-1/2} = \alpha^{-1} Id + (Rs,\alpha)^{-1/2} Rb (Rs,\alpha)^{-1/2} \qquad (2)$$

or else $A = \alpha^{-1} Id + B$ with Id the identity matrix

2—if the matrix Rs is not invertible, this being the case particularly if the number M of useful signals is less than the number N of sensors of the array N. The matrix is rendered invertible by adding a term $\delta$ Id, with $\delta < \sigma^2$, where $\sigma^2$ is the background noise power. The matrix to be considered in the subsequent steps of the process then corresponds to $Rs,\alpha = \alpha Rs + \delta$ Id.

The correlation matrix Rb calculated subsequently will comprise the entire contribution from the interfering signals, and a reduced contribution from the background noise (of power $\sigma^2 - \delta$), this amounting to artificially increasing the INR (Interference to Noise Ratio) of the interfering signals in the estimated correlation matrix.

As mentioned above, expression (2) can be of the form $A = \alpha^{-1} Id + B$ b) decomposing whitened matrix A obtained in the course of step a) into eigenelements $$A = Rs^{-1/2} Rx Rs^{-1/2} = \sum_{i=1}^{N} \lambda_i u_i u_i^t \qquad (3)$$

where: $\lambda_i$ and $u_i$ respectively represent the eigenvalues and the eigenvectors of the matrix A.

At the end of step b) the eigenvalues $\lambda_i$ and the eigenvectors $u_i$ of the matrix A are known, with $$\lambda_1 \leq \lambda_2 \leq \ldots \leq \lambda_N$$

c) constructing a matrix B on the basis of the eigenvalues and of the eigenvectors obtained in step b).

In the case where the number of interfering signals is strictly less than the number N of sensors, and in the absence of background noise, the matrix $B = (Rs,\alpha)^{-1/2} Rb (Rs,\alpha)^{-1/2}$ is then of rank N-P, (N being the number of sensors and P the number of interfering signals) and according to equation (2) the matrix A possesses P eigenvalues greater than $\alpha^{-1}$ and N-P identical eigenvalues such that: $\lambda_1 = \lambda_2 = \ldots = \lambda_{N-P} = \alpha^{-1}$.

Under these conditions, the matrix B computed has eigenelements:
- eigenvectors vi which are substantially identical to the eigenvectors ui of the matrix A, and
- eigenvalues $\gamma i$ equal to the eigenvalues $\lambda_i - \lambda_1$ The matrix B can for example be expressed through the relation $$B = \sum_{i=1}^{N} (\lambda_i - \lambda_1) u_i u_i^t \qquad (4)$$

with $\gamma i = (\lambda_i - \lambda_1)$ d) knowing B and the correlation matrix Rs, it is possible to obtain the correlation matrix of the interfering signals $$Rb = Rs^{1/2} B Rs^{1/2} \qquad (5)$$

Relations (2) to (5) above, written out on the basis of the theoretical correlation matrices, serve as a basis for the steps of the process according to the invention which use the estimates of the matrices.

The steps set forth hereinabove using the theoretical correlation matrices are applied to the matrix estimates.

This involves the knowledge of the estimates of the correlation matrices of the useful signals and of the sensor signals so as to determine the estimate of the matrix of the interfering signals.

To do this, the information available regarding the useful signals must make it possible to construct a good enough estimation of the correlation matrix Rs, to within a multiplicative constant. This estimation can be obtained in several ways described hereinbelow.

The number P of interfering signals is preferably less than the number N of sensors constituting the reception antenna.

If this latter condition is not satisfied, a bias will be obtained in the estimation of the matrix Rb.

The process implements several steps mentioned in the algorithm of FIG. 2.

A) Determining the Whitened Matrix A Through the Following Steps

1st step—10—estimating the correlation matrix $\hat{R}s$ on the basis of the information regarding the useful signals.

For example, if the processing knows the direction vectors (which may be determined on the basis of the directions of arrival) and the powers of the useful signals, the estimated correlation matrix $\hat{R}s$ may be written:

$$\hat{R}s = \sum_{m=1}^{M} \pi_m s_m s_{mt} \quad (6)$$

with $\pi_m$=the power
and $s_m$=direction vector

If the correlation matrix thus formed is not invertible, the matrix is rendered invertible as set forth above by adding a term $\delta$ Id:

$$\hat{R}s = \sum_{m=1}^{M} \pi_m s_m s_{mt} + \delta Id \quad (7)$$

as the case may be, expression (6) or expression (7) is used subsequently in the process.

2nd step—20—estimation of the correlation matrix of the sensor signals received over K samples, on the basis for example of the unbiased conventional estimator:

$$\hat{R}x = \frac{1}{K}\sum_{k=1}^{K} x(k)x(k)^t \quad (8)$$

The integration of the correlation matrix $\hat{R}x$ must be performed over a sufficient number of samples K so as to be able to neglect the correlation terms correlating the useful signals and the interfering signals.

3rd step—30—calculation of the matrix $A=\hat{R}s^{-1/2}\hat{R}x\hat{R}s^{-1/2}$ and decomposition of the matrix A into eigenelements $$A = \sum_{i=1}^{N} \lambda_i u_i u_i^t \quad (9)$$

with $\hat{R}_s^{-1/2}$ inverse square root of $R_s$

The calculation and decomposition are described for example in the book entitled "Numerical Recipes in C" written by W. H. PRESS, B. R. FLANNERY, S. A. TEUKOLSY, W. T. VETTERLING, 1992 (Publisher: Cambridge University).

On completion of this 3rd step the eigenvectors $u_i$ and the eigenvalues $\lambda_1$ of the matrix A are known.

B) Determining a Matrix B and the Estimate of the Matrix of the Interfering Signals 4th step—40—formation of the matrix B on the basis of the elements of A by determining its eigenelements: eigenvectors and eigenvalues the eigenvectors $v_1$ are substantially equal or equal to the eigenvectors $u_1$ obtained by decomposition of the matrix A, the eigenvalues $\gamma_1$ are substantially equal or equal to the eigenvalues $\lambda_i$ obtained by decomposition of the matrix A and corrected by a value or constant $\beta$ which is chosen on the basis of the N-P smallest eigenvalues of the matrix A or equal to the smallest eigenvalue of the matrix A.

The matrix B then takes the following expression:

$$\sum_{i=1}^{N} (\lambda_i - \beta) u_i u_i^t \quad (10)$$

Advantageously, the value of the constant $\beta$ is the smallest of the eigenvalues $\lambda_1$.

According to another embodiment, the value of the constant $\beta$ is determined by averaging the N-P eigenvalues of the matrix A.

5th step—50—determining the correlation matrix of the interfering signal vectors On the basis of B and of the estimated value of the matrix $\hat{R}s$, the process makes it possible to obtain the estimated value of the correlation matrix $\hat{R}b$ corresponding to the interfering signals.

$$\hat{R}b = \hat{R}s^{1/2} B \hat{R}s^{1/2} \quad (11)$$

Knowledge of the estimated value of the correlation matrix of the interfering signals can be used in various processings of signals, some examples of which are given hereinbelow by way of wholly nonlimiting illustration.

The process according to the invention is applied in various types of applications, some of which are given by way of wholly nonlimiting illustration.

Application to Goniometry

Several methods of goniometry are based on utilizing the correlation matrix of the signals received on an array of sensors. Some of these methods, the so-called high-resolution methods such as the MUSIC method described for example in reference [1] or the ESPRIT method described in reference [2] for example make it possible to effect the goniometry of several sources arriving simultaneously on an array of sensors.

[1] Article entitled "Multiple Emitter Location and Signal Parameter Estimation" from the IEEE Trans. Ant. Prop. journal, vol. AP-34, No. 3, pp 276–280, March 1986 written by M. R. D. Schmidt.

[2] Article entitled "Estimation of Signal Parameters via Rotational Invariance Techniques" from the IEEE Transaction ASSP journal, vol. ASSP-37, pp 984–995, July 1989 written by M M. Roy, T. Kailath.

However, these methods possess certain limitations: the use of an array of N sensors thus typically makes it possible to perform the goniometry of N/2 sources.

When the array receives useful signals and interfering signals, it is possible to separate them, by implementing the process steps described hereinabove. After having separated the interfering signals from the useful signals, the goniometry is for example performed according to the methods known to the person skilled in the art, by implementing solely the estimated correlation matrix $\hat{R}b$. The goniometry determines the directions of arrival of the P interfering signals, and not the directions of arrival of M+P sources, thereby improving its performance. It is carried out as if the useful signals were absent.

The application of the process according to the invention requires a lesser number of sensors than that customarily used in the prior art.

Application to Spatial Filtering

SLC

The basic diagram of the SLC is recalled in FIG. 3. The SLC is used to protect the useful signals arriving from a given direction in relation to interfering signals.

It is described for example in the following references [3] and [4]:

[3] Article entitled "Adaptive Arrays" from the IEEE Trans. Ant. Prop. journal, vol. AP 24, No.5, pp 585–598, September 1976, written by S. P. Applebaum.

[4] Article entitled "Explorations in fixed and adaptive resolution at GE and SURC", from the IEEE Trans. Ant. Prop. journal, vol. AP 24, No.5, pp 585–598, September 1976, written by P. W. Howells.

It is based on the use of a directional main sensor 60, pointing in the direction of the useful signals, and of L auxiliary sensors 61 making it possible to eliminate the influence of the interfering signals present in the main channel. The L auxiliary sensors and the main sensor constitute the array of N sensors.

The weightings $w_a$ of the SLC are calculated in such a way as to minimize the total power of the output signal $y_p(t) - w_a^\dagger z(t)$. They are expressed on the basis of Rz, the correlation matrix of the signals of the auxiliary channels and of $r_{zy}$, the cross-correlation vector between $z(t)$ and $y_p(t)$:

$$w_a = Rz^{-1} r_{zy} \quad (12)$$

with $Rz = E(z(t), z(t)^\dagger)$ and $r_{zy} = E(z(t), y_p(t)^\dagger)$ where $z(t)$ is the output signal of the auxiliary channels and $y_p(t)$ the output signal of the main channel.

The SLC must be employed with care, so as to avoid the risk of eliminating the useful signals. The lower the power of the jammers relative to the useful ones, or the greater the number of auxiliary channels than the number of jammers, the larger is this risk. The SLC must be properly conditioned. Thus, the auxiliary channels must be as undirectional as possible in the direction of the useful signals and as directional as possible in the direction of the jammers.

In order to avoid the risk of eliminating the useful signals, several methods of robustification of the SLC exist in the literature:

addition of fictitious noise in such as way as to "mask" the presence of the useful signals, norm constraint on the weightings $w_a$: $\|w_a\| < \text{Max}, \ldots$.

The process according to the invention consists in implementing the SLC as if the useful signals were absent, by estimating the correlations of expression (12) corresponding to the interfering signals. The risk of their elimination is thus removed and the algorithm optimizes the elimination of the interfering signals and not of the useful signals.

To do this, the correlation matrix $\hat{R}b$ is estimated by implementing the steps of the process according to the invention and by putting $x(t) = [z(t)^T \ y_p(t)]^T$. Formula (12) then makes it possible to obtain the weightings $w_a$, by regarding the matrix Rz (respectively the vector $r_{zy}$) as corresponding to the first L rows and to the first L columns (respectively to the first L rows of the last column) of the estimated matrix $\hat{R}b$.

Spatial Matched Filter—FIG. 4

In order to protect a useful signal whose direction of arrival is known, it is possible to implement the spatial matched filter based on direction of arrival.

The algorithm used consists in minimizing the total output power of the antenna while maintaining a unit gain in the direction of the useful signal. The following notation is used:

w, the weighting vector corresponding to the spatial filter, s, the direction vector of the useful signal, which is obtained for example on the basis of the knowledge of the direction of the useful signal, known or estimated by goniometry for example, $y(t) = w^\dagger x(t)$ the output of the spatial filter.

The vector w may be written:

$$w = a \, Rx^{-1} s,$$

where a is a near multiplicative constant.

The obtaining of the vector w is for example described in reference [5] entitled "Système mixte de goniométrie à haute résolution et de réjection adaptative de brouillerus dans la gamme HF" [Hybrid system for high-resolution goniometry and adaptive rejection of jammers in the HF range], written by F. Pipon, P. Chevalier, G. Multedo and published in Proc. GRETSI, pp 685–688, September 1991.

The spatial filter leads to the maximization of the SNIR: ratio of the power of the signal arriving from the direction corresponding to the direction vector s (useful signal) to the sum of the power of the background noise and of the power of the signals coming from the other directions (interfering signals).

In practice, w is estimated using the estimated correlation matrix $\hat{R}x$, and a vector $\hat{s}$ close to the true direction vector s.

This technique requires that the direction vector s be known perfectly. Specifically, when $\hat{s}$ does not correspond to the direction vector s, the algorithm is at risk of eliminating the useful signal.

The process according to the invention makes it possible to circumvent this risk and to improve the performance of the spatial matched filter.

The spatial filter w is calculated on the basis of the estimated matrix $\hat{R}b$, determined by implementing the process according to the invention, calculated according to the invention, and of $\hat{s}$. The spatial filter w is then equal to: a $\hat{R}b^{-1}\hat{s}$.

The use of this method also advantageously makes it possible to improve the speed of convergence of the algorithm for calculating w.

Without departing from the scope of the invention, the process is applied in particular in the following fields:

irrespective of the type of source: narrowband, broadband, or multipath, space telecommunications, for example for protecting a theater of operations with regard to interference, passive listening, for example after a goniometry step and intensimetry of the transmitters received, GE: angular locating of interference in the presence of known signals, radar, acoustics, radio communications.

What is claimed is:

1. A process for estimating a correlation matrix of signals of unknown characteristics, which are received by an array comprising a number N of sensors, to process signals received by said array, said sensors receiving at least first signals of unknown characteristics and second signals of known characteristics, the first and second signals together forming sensor signals, the process comprising:

a) determining a correlation matrix $\hat{R}s$ or $Rs,\alpha$ of the signals of known characteristics;

b) estimating a correlation matrix $\hat{R}x$ of the sensor signals;

c) forming a matrix A equal to $A = \hat{R}s^{-1/2} \hat{R}x \, \hat{R}s^{-1/2}$;

d) decomposing the matrix A into eigenelements to obtain its eigenvalues $\lambda_i$ and its eigenvectors $u_i$, with $$\lambda_1 \leq \lambda_2 \leq \ldots \leq \lambda_N$$

e) constructing a matrix B having eigenvectors v1 substantially equal to the eigenvectors $u_i$ of the matrix A, and eigenvalues $\gamma_i$ equal to the eigenvalues $\lambda_1$ to within a constant, a value of a constant $\beta$ being determined based on N-P smallest eigenvalues of the matrix A, P being a number of jammers or interfering signals, with $$\lambda_1 \leq \beta \leq \lambda_{N-P}; \text{ and}$$

f) determining an estimated correlation matrix $\hat{R}b$ of interfering signals based on the estimated matrix $\hat{R}s$ and the matrix B, such that $\hat{R}b = \hat{R}s^{1/2} B \hat{R}s^{1/2}$.

2. The process as claimed in claim 1, wherein $\beta$ corresponds to a smallest of the eigenvalues $\lambda_i$.

3. The process as claimed in claim 1, wherein $\beta$ is determined based on the N-P smallest of the eigenvalues $\lambda_i$ by taking an average value.

4. The process as claimed in claim 1, wherein the correlation matrix $\hat{R}s$ determined in a) is determined based on information regarding a power and directions of arrival of useful signals according to expression:

$$\hat{R} = \sum_{m=1}^{M} \pi_m s_m s_m^t$$

with $\pi_m$ = the power and $s_m$ = direction vector.

5. The process as claimed in claim 1, wherein the matrix Rs or Rs,α, is rendered invertible by adding a term $\delta$ Id, with $\delta < \sigma^2$ where $\sigma^2$ is a background noise power.

6. The process as claimed in claim 1, further comprising performing goniometry on the interfering signals by using the estimated matrix $\hat{R}b$ obtained in f).

7. The process as claimed in claim 1, further comprising determining weightings $w_a$ in a device of SLC type where the N sensors comprise L auxiliary sensors and a main sensor, by determining a matrix Rz corresponding to first L rows and first L columns of the estimated matrix $\hat{R}b$ and a vector $R_{Zy}$ corresponding to the first L rows of a last column of the estimated matrix $\hat{R}b$ and by using the expression $w_a = Rz^{-1} r_{Zy}$ with $Rz = E(z(\dagger), z(\dagger)^\dagger)$ and $r_{Zy} = E(z(\dagger), y_p(\dagger)^\dagger)$.

8. The process as claimed in claim 1, further comprising determining a spatial filter w based on the estimated matrix $\hat{R}b$ with $w = a \hat{R}b^{-1}s$.

9. The application of the process as claimed in claim 1 to antenna processing.

10. A device for estimating a correlation matrix of signals of unknown characteristics, which are received by an array comprising a number N of sensors, to process the signals received by said array, said sensors receiving at least first signals of unknown characteristics and second signals of known characteristics, the first and second signals together forming sensor signals, the device comprising means for implementing the process as claimed in claim 1.

* * * * *